United States Patent
Drai

(10) Patent No.: US 10,765,893 B2
(45) Date of Patent: Sep. 8, 2020

(54) MULTI FUNCTION HAND TOOL IN A UNITARY DEVICE

(71) Applicant: Yehoshua Drai, Plantation, FL (US)

(72) Inventor: Yehoshua Drai, Plantation, FL (US)

(*) Notice: Subject to any disclaimer, the term of this patent is extended or adjusted under 35 U.S.C. 154(b) by 116 days.

(21) Appl. No.: 15/902,676

(22) Filed: Feb. 22, 2018

(65) Prior Publication Data

US 2019/0255366 A1   Aug. 22, 2019

(51) Int. Cl.
  *A62B 3/00*  (2006.01)
  *B25D 1/14*  (2006.01)
  *B25F 1/00*  (2006.01)
  *B60R 22/32*  (2006.01)

(52) U.S. Cl.
  CPC ............... *A62B 3/005* (2013.01); *B25D 1/14* (2013.01); *B25D 2250/271* (2013.01); *B25D 2250/295* (2013.01); *B25F 1/00* (2013.01); *B60R 2022/328* (2013.01)

(58) Field of Classification Search
  CPC .... A62B 3/005; B25D 1/14; B25D 2250/271; B25D 2250/295; B60R 2022/328; B25F 1/00
  USPC ........................................ 7/119, 138
  See application file for complete search history.

(56) References Cited

U.S. PATENT DOCUMENTS

| | | | |
|---|---|---|---|
| D152,822 S * | 2/1949 | Overshiner | D8/16 |
| 7,627,951 B2 * | 12/2009 | Glesser | B26B 1/04 30/153 |
| 9,242,383 B2 * | 1/2016 | Drai | B26B 1/044 |
| 9,815,212 B2 * | 11/2017 | Barr | B26B 1/044 |
| 2009/0313765 A1 * | 12/2009 | Krudo | B26B 11/00 7/158 |

* cited by examiner

*Primary Examiner* — Hadi Shakeri
(74) *Attorney, Agent, or Firm* — David W Barman

(57) ABSTRACT

A survival rescue multi-tool device is provided in a single planer body constructed and arranged to have incorporated therewith multiple hand tool configurations and an overall curved ergonomic formation.

3 Claims, 8 Drawing Sheets

MULTI FUNCTION HAND TOOL IN A UNITARY DEVICE

BACKGROUND OF THE INVENTION

There are many tools on the market utilized by persons in search and rescue operations. It is well known that multi-function tools are available. The typical pocket knife or Swiss Army knife is but one well-known example. However, there is a significant deficiency in tools configured in this manner. The thickness of these devices and the need to extend and retract a desired tool often costs valuable time. The present invention has addressed this by providing a multi-tool configuration in a single planer device.

SUMMARY OF THE INVENTION

The present invention provides a unique device whereby multiple hand tools are configured in a unitary body. In so configuring, the need to locate, extend, and retract to access a function and/or tool, is eliminated. The tool thus is not only a significant improvement, but is utilized more rapidly and is therefore particularly useful and helpful in emergency situations.

In one embodiment, the present invention is a survival rescue multi-tool device comprising: a single planer body constructed and arranged to have incorporated therewith a cylinder wrench with access from the perimeter of the device; measuring indicia; a nail puller; a single hammer surface; an assembly configured as a dual-striking surface utilizing each of two congruent flathead screwdriver formations; a single finger grasp cavity, and an overall curved ergonomic formation.

In one embodiment, the present invention further comprises a configuration constructed and arranged to break glass as a dual-hammer surface utilizing kinetic spinning each of two congruent flathead screwdriver formations to strike with high impact or directly through a single pronged hammer surface feature.

In one embodiment, the present invention further comprises a hinge and lock mechanism whereby said tool has a first folded configuration and a second unfolded configuration.

In one embodiment, the present invention is a method of breaking glass, said method comprising the steps of:
  providing a device as described herein;
  grasping the device by having a user insert one finger into said finger grasp cavity;
  rotating said device around said finger in said finger grasp cavity;
  ceasing said rotation by striking said two congruent flathead screwdriver formations against a glass surface, said striking resulting in breaking said glass surface.

In one embodiment, the present invention is a survival rescue multi-tool device consisting of: a single planer body constructed and arranged to have incorporated therewith a cylinder wrench with access from the perimeter of the device; measuring indicia; a nail puller; a single hammer surface; an assembly configured as a dual-striking surface utilizing each of two congruent flathead screwdriver formations; a single finger grasp cavity, and an overall curved ergonomic formation.

DETAILED DESCRIPTION OF THE PREFERRED EMBODIMENTS

As generally understood and demonstrated by the figures, the present invention provides for a survival rescue multi-tool that is configured with a plurality of components that a person involved in a rescue activity can typically use. By providing these components in a single planer configuration, the awkwardness often accompanied by multi-component tools, such as the conventional Swiss Army knife and the like, are avoided.

The following provides for a listing of components as demonstrated in the figures. Cylinder wrench 1 is configured as a valve opener for most portable oxygen cylinders. These include C, D, and E type oxygen cylinders typically used in ambulances, aviation, and other rescue situations. By incorporating this tool into the planar configuration of the present invention, the present invention is capable of increased torque when compared to conventional cylinder wrenches.

A grip cavity 2 is configured such that rope or cable can be threaded through there and further includes a tapered area 9, whereby said narrowing area constructed and arranged to not only bind rope or cable inserted through the cavity 2 with a twisting motion of the tool, but further functions as a variable diameter wire stripper.

Figure 1:
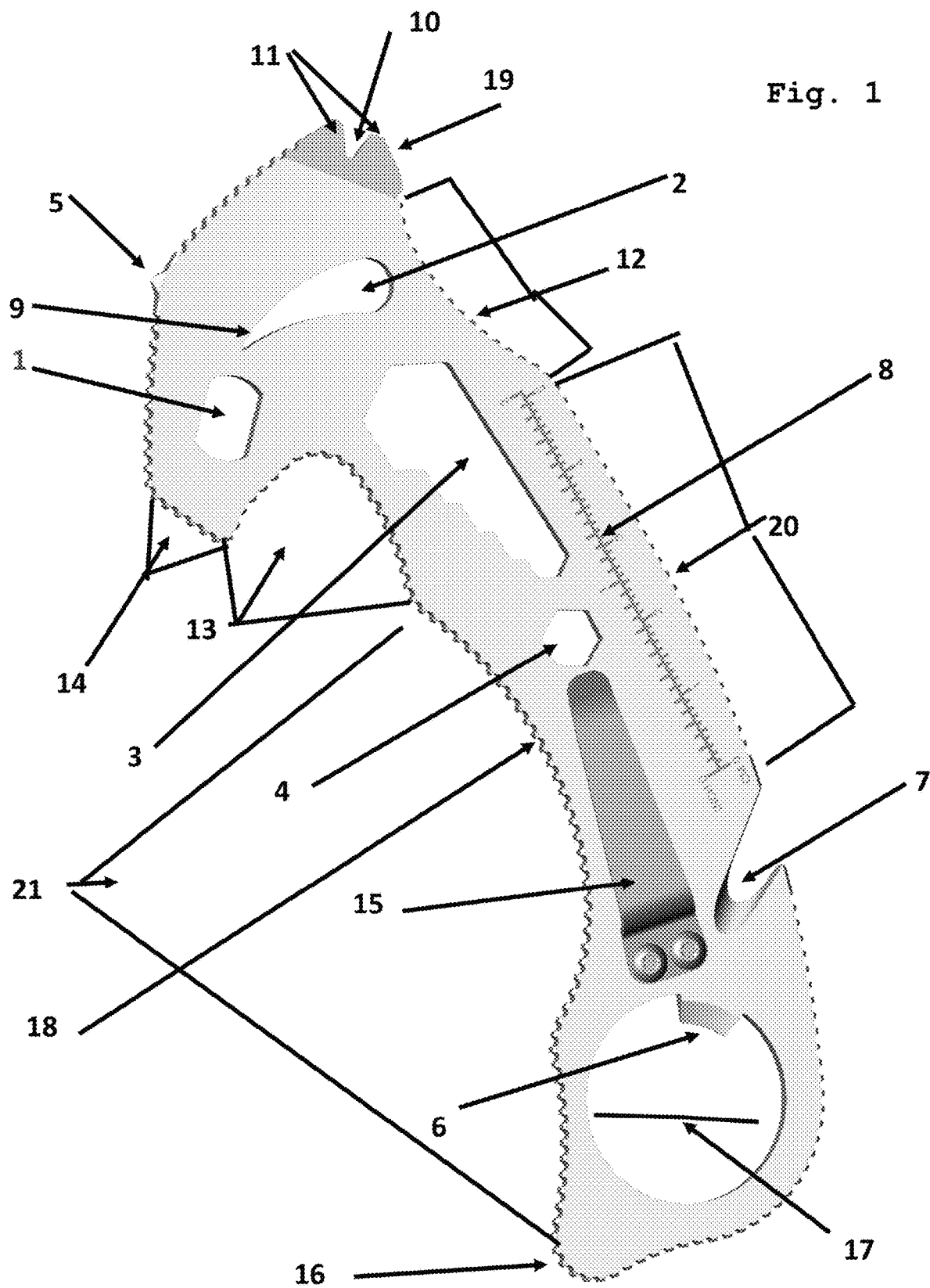
FIG. 1 is a planned view demonstrating components according to one embodiment of the present invention.

Hex wrench cavity 3, as demonstrated in FIG. 1, is unique in that the single cavity is provided with multiple graduations, thus a single wrench cavity is configured to quickly adapt to various wrench sizes. In addition to being configured with the graduated hex nut cavity 3, the device of the present invention has a ¼-inch nut cavity 4 for a variety of applications.

Glass break prong 5 is a single point glass-breaking configuration that allows a user to strike and break a variety of glass surfaces using a hammer effect of the device. In one environment of use, this configuration will apply pressure to any pressure point in order to control the body and actions of an adversary.

Configured within finger grasp cavity 17 is bottle cap opener 6.

The present invention further includes sharpened cutting cavity 7, whereby the cavity terminates inward on a sharpened surface, and the sharpened surface of cavity 7, as demonstrated in the figure, being the surface inward from the perimeter of the device, is configured to cut many different materials, including seat belts, ropes, cords, and the like.

Printed indicia 8 on the device of the present invention provides for English and metric ruler measurements. The device is also configured with nail puller cavity 10, which has immediately adjacent thereto, congruent flat edges 11 that are configured to each function as a flathead screwdriver and can be used in concert to break glass.

Grip curvature 12 is configured such that a user can hold a thumb against this particular surface for grasping the device. Hook curve 13 is constructed and arranged as a grasping and pulling region. In different embodiments, it is constructed and can be utilized to pull clothing, backpacks, belts, and the like. This hooked curve can pull and rescue someone from a hazardous situation, and can also be used to hook and control the hands, wrists, or fingers of an adversary.

Hammer edge 14 is constructed and arranged to be used as a hammer for manual impact. The entire device is configured with grooves 18 about the perimeter. This is to improve the grip and effectiveness when using the device in a self-defense application or any other function that requires a secure grip. The Clip 15 provides a secure method of keeping the tool secure and readily accessible for any possible need.

In one embodiment, there is a tourniquet configuration whereby two of the openings/cavities (Hex wrench cavity 3 and/or finger grasp cavity 17, functions as windlass rod for a tourniquet and the hook curve 13 and the clip 15 can be used to secure the tourniquet once the twisting action is complete.

In another embodiment, using any two of the openings/cavities (depending on the width of the strap or diameter of the binding cord), can be used as a windlass rod for a tourniquet using a strap or binding cord and the hook curve 13 and the clip 15 can be used to secure the tourniquet once the twisting action is complete.

Figure 4B:
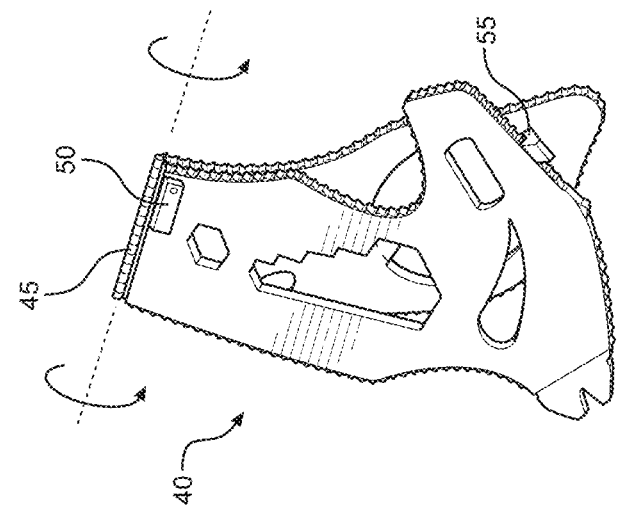
FIG. 4B is one embodiment, whereby the article is a foldable embodiment in a folded position.
Figure 4A:
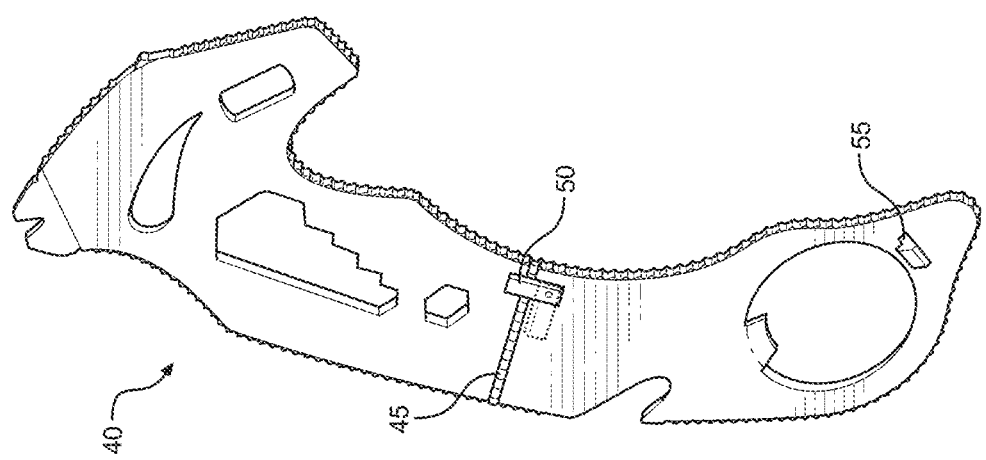
FIG. 4A is one embodiment, whereby the article is a foldable embodiment in an extended lock position.
Figure 5:
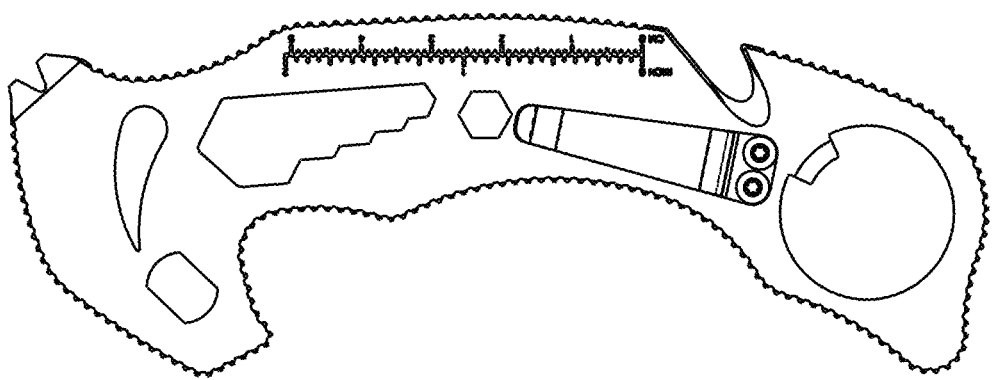
FIG. 5 is plan view of one embodiment of the invention.
Figure 6:
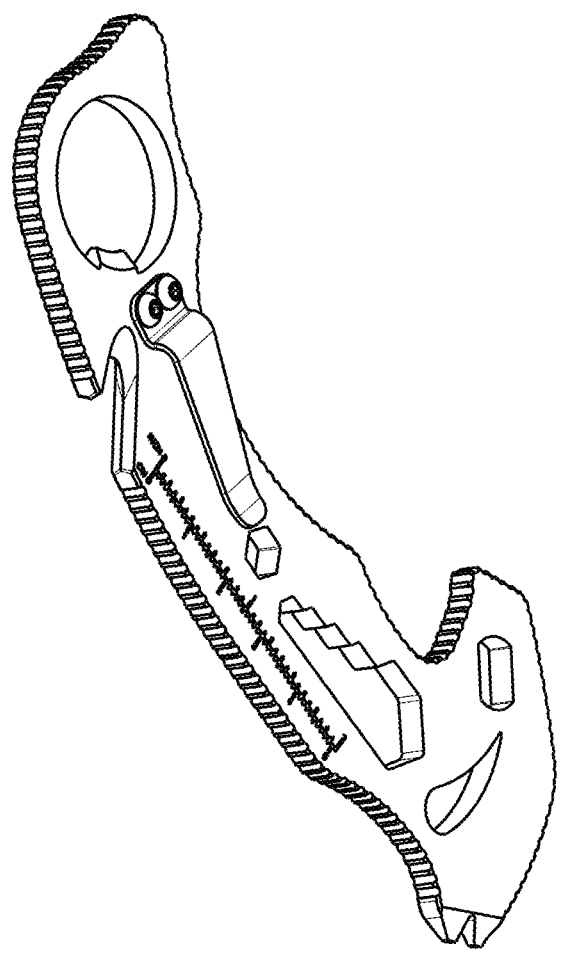
FIG. 6 is a top perspective view of one embodiment of the invention.
Figure 7:
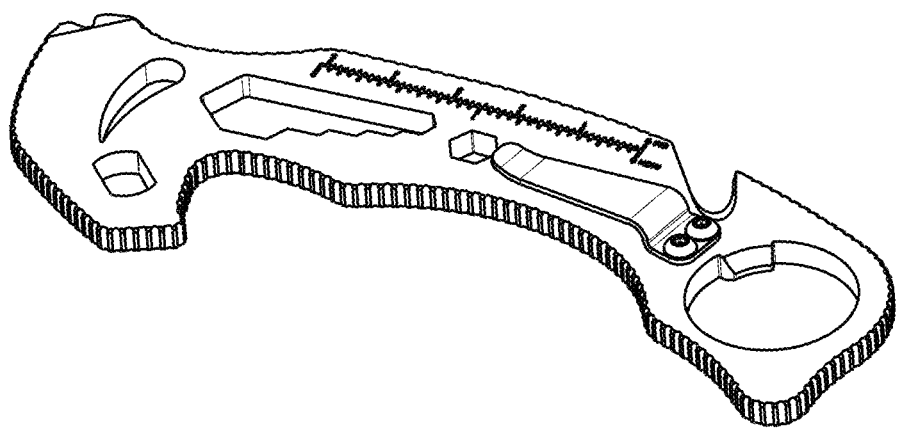
FIG. 7 is a bottom perspective view of one embodiment of the invention.
Figure 8:
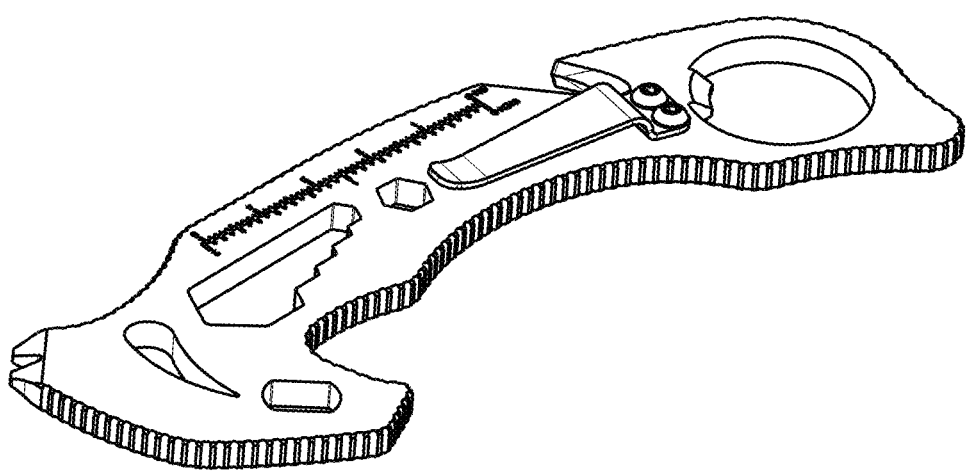
FIG. 8 is a bottom perspective view of one embodiment of the invention.

In one embodiment, as shown in FIGS. 4A and 4B, device 40 has a hinge 45 and lock 50. This imparts an open or extended configuration as in FIG. 4A. Device 40 folds along hinge 45 as demonstrated by directional arrows in FIG. 4B. Optionally, the device includes a locking clip 55 to lock into the closed positions. Although a particular lock mechanism is provided in the figures, the invention contemplates utilization of other locking/unlocking mechanisms to accomplish the desired configurations of this embodiment.

Figure 2:
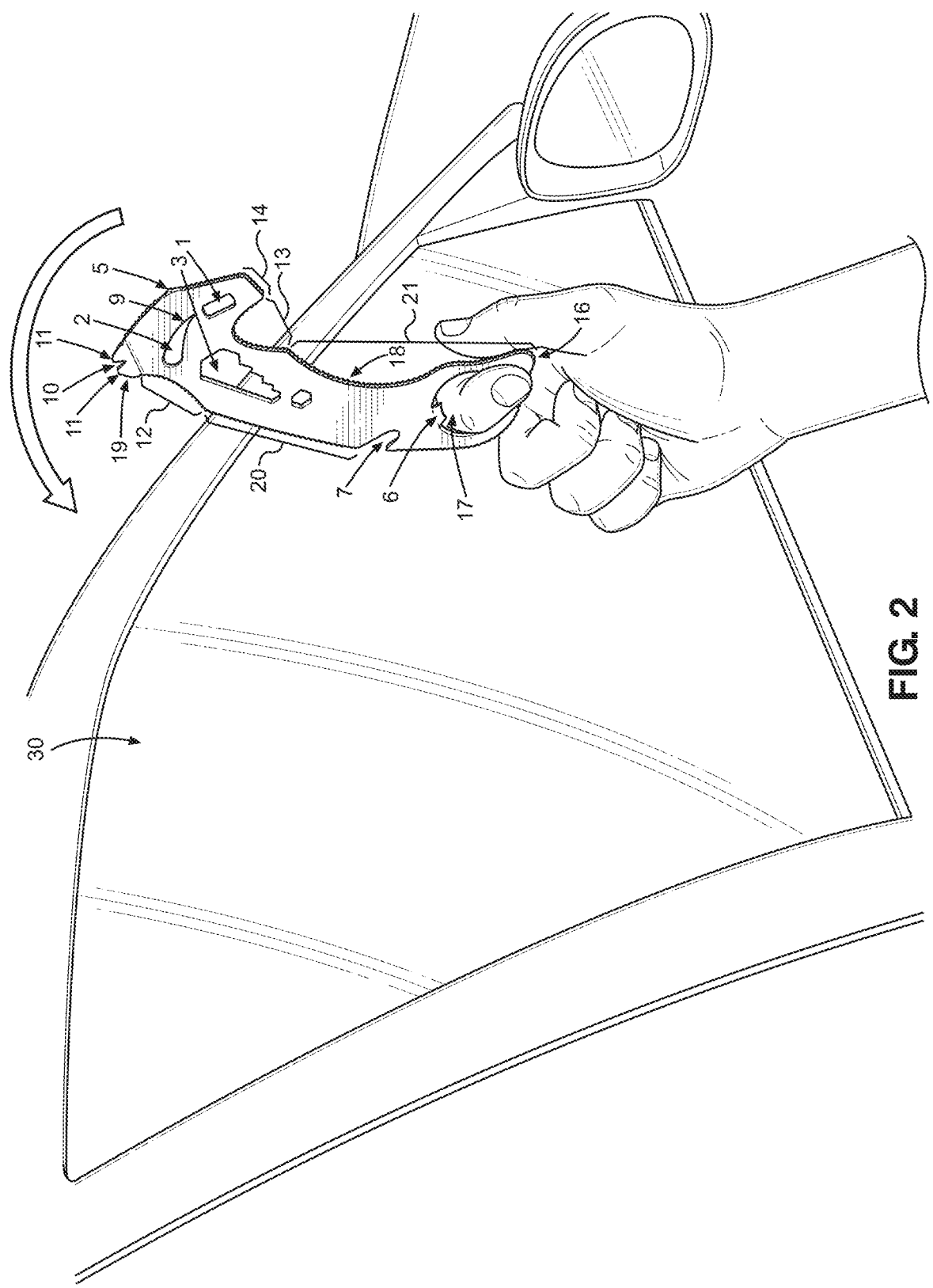
FIG. 2 is the first of directional views demonstrating a position for using a glass breaking figure according to one embodiment of the present invention.
Figure 3:
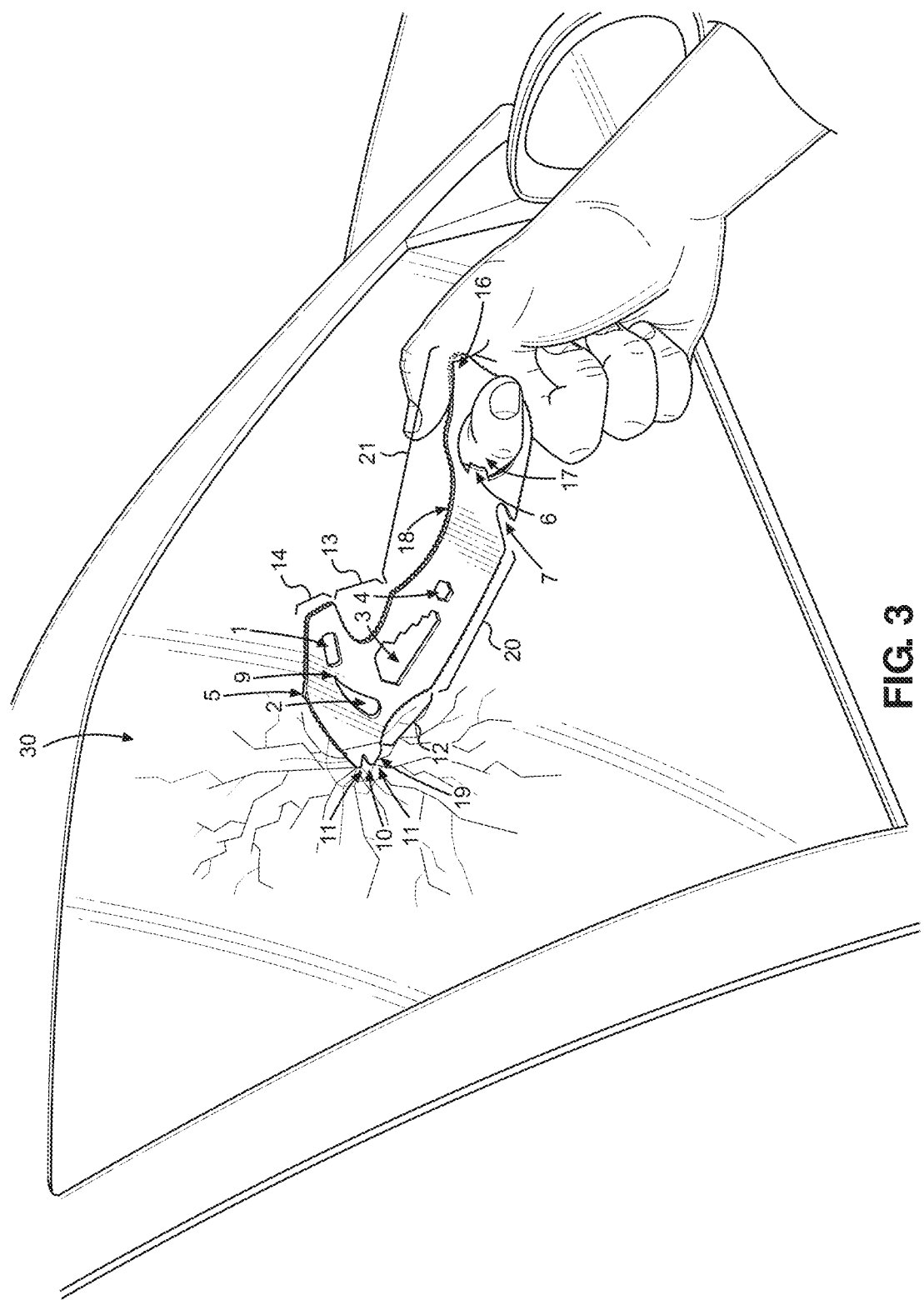
FIG. 3 is a continuation from FIG. 2, whereby the article of the present invention is used to break a glass pane.

When the device is used as demonstrated in FIGS. 2 and 3, assembly 19, which is formed of the two surfaces 11, is effective in providing circular motion as shown in FIG. 2 to smash glass pane 30, as demonstrated in FIG. 3. Grip surface 20 has a curvature that facilitates grasping the device with surface 20 contacting the hand palm of a user. Curved configuration 21 is configured to fit the fingers of a user's hands with a variety of grips, including a normal or hammer grip, whereby hammer surface 14 is utilized.

What is claimed is:

1. A survival rescue multi-tool device consisting of: a single planer body constructed and arranged to have incorporated therewith a cylinder wrench configured as a valve opener; measuring indicia; a grip cavity for threading a rope therethrough with a tapering area that is configured to bind the rope and further to function as a wire stripper; two congruent flathead screwdriver formations; a nail puller defined by a nail puller cavity between said two congruent flathead screwdriver formations; a single hammer surface being a glass break prong; an assembly configured as a dual striking surface utilizing each of said two congruent flathead screwdriver formations; a single finger grasp cavity, and an overall curved ergonomic formation.

2. The tool of claim 1 further comprising a configuration constructed and arranged to break glass with said dual-striking surface utilizing each of said two congruent flathead screwdriver formations utilizing kinetic spinning to apply each of said two congruent flathead screwdriver formations to strike with high impact or directly through said single hammer surface being a glass break prong.

3. A method of breaking glass, said method comprising the steps of providing a device of claim 1; grasping the device by having a user insert one finger into said finger grasp cavity; rotating said device around said finger in said finger grasp cavity; ceasing said rotation by striking said two congruent flathead screwdriver formations against a glass surface, said striking resulting in breaking said glass surface.

* * * * *